United States Patent [19]

Condon

[11] 4,419,086
[45] Dec. 6, 1983

[54] TRUNNION SEAL AND CROSS VENTING SYSTEM FOR A CARDAN-TYPE UNIVERSAL JOINT

[75] Inventor: William T. Condon, Rockford, Ill.

[73] Assignee: Twin Disc, Incorporated, Racine, Wis.

[21] Appl. No.: 301,301

[22] Filed: Sep. 11, 1981

[51] Int. Cl.$^3$ ............... F16D 3/26; F16D 3/40
[52] U.S. Cl. ..................... 464/14; 277/92; 464/131
[58] Field of Search ............ 464/11, 14, 128, 130, 464/131, 132, 133; 277/92; 305/11

[56] References Cited

U.S. PATENT DOCUMENTS

| | | | |
|---|---|---|---|
| 1,968,787 | 7/1934 | Slaght et al. | 464/14 |
| 2,081,505 | 5/1937 | Padgett | 464/131 X |
| 2,996,901 | 8/1961 | Kleinschmidt | 464/131 |
| 3,091,948 | 6/1963 | Zeller | 464/14 |
| 3,138,942 | 1/1963 | Kayser | 464/131 |
| 3,200,615 | 8/1963 | Stokely | 464/14 |
| 3,266,269 | 8/1966 | Stokely | 464/131 |
| 3,352,127 | 11/1967 | Skinner, Sr. | 464/131 |
| 3,377,820 | 4/1968 | Smith, Jr. | 464/14 X |
| 3,479,840 | 11/1969 | Meyers | 464/131 |
| 3,635,535 | 1/1972 | Schultenkamper | 464/14 X |
| 4,077,634 | 3/1978 | Durham | 277/92 |
| 4,087,100 | 5/1978 | Yoshihashi et al. | 277/92 |
| 4,116,019 | 9/1978 | Welschof | 464/131 |
| 4,176,848 | 12/1979 | Lafuze | 277/92 |
| 4,256,315 | 3/1981 | Larson et al. | 277/92 |
| 4,261,186 | 4/1981 | Hopf et al. | 464/14 X |
| 4,337,628 | 7/1982 | Greene | 464/131 |

FOREIGN PATENT DOCUMENTS

| | | | |
|---|---|---|---|
| 274670 | 6/1970 | U.S.S.R. | 464/14 |
| 475465 | 6/1975 | U.S.S.R. | 464/14 |

Primary Examiner—Stuart S. Levy
Assistant Examiner—Daniel P. Stodola
Attorney, Agent, or Firm—James E. Nilles

[57] ABSTRACT

A mechanical, metal face type seal, lubrication and venting system for a universal joint of the type having a cross-shaped trunnion body with cylindrical bushings located at the outer ends of each of the trunnions. The seals consist of a metal face type seal having a pair of face seals with a bias that provides seal sealing of internal pressure. An elastomeric seal is provided and functions as a static seal.

4 Claims, 5 Drawing Figures

TRUNNION SEAL AND CROSS VENTING SYSTEM FOR A CARDAN-TYPE UNIVERSAL JOINT

BACKGROUND OF THE INVENTION

U.S. Pat. Nos. 3,091,948; 3,352,127 and 4,116,019 show examples of universal joint bearing seals of the elastomeric, purging type. These seals utilize a single lip for sealing lubricant in the bearing area. When internal lubricant pressures exceeds the design sealing pressure, then the lip will be forced open and lubricant will exude from the bearing area. These seals have certain deficiencies. For example, the purging seal has a static design purge pressure which exceeds the operating pressure due to centrifugal head, however, the seal lip must then operate at high contact pressures at lower speeds, causing lip wear. This wear will reduce the purge pressure below the centrifugal head after a period of operation and the seal lip will leak lubricant when the cross and bearing is operated at higher speeds. The single lip type is un-protected from external contaminants and abrasion which is a secondary cause of lip wear.

U.S. Pat. Nos. 3,138,942; 3,200,615; 3,266,269; 3,377,820 and 3,479,840 show examples of elastomeric dual lip purging seals. The outer lip's principal function is to prevent abrasive contaminants from reaching the primary sealing lip. This type of design minimizes wear due to external contaminants, however, the primary seal lip is identical in design philosophy to a single lip purging seal and is subject to the same wear.

Thus it can be seen that the typical elastomeric purging type universal joint trunnion seal, both single and dual lip, leaks lubricant because of wear.

U.S. Pat. No. 2,996,901 shows an example of a dual reversed lip non-purging seal. The inner lip is the principal seal and the outer lip is for exclusion of external contaminant. This patent also describes an additional separate sealing device for further protection of the primary seal from external contamination. The non-purging seal has deficiencies similar to the purging type. For example, the non-purging seal has a low static design pressure, however, the lip must operate at maximum contact pressure when it is subjected to the centrifugal head at high speed, causing heavy lip wear. This wear has initially little effect on the lip's ability to seal at high speeds, but the wear impairs its ability to seal at low speeds and under static conditions. Eventually the wear becomes excessive and the seal will leak at high speed. Thus it can be seen that an elastomeric non-purging type universal joint trunnion seal leaks lubricant because of wear.

Universal joint cross trunnions and bearings use trunnion seals which fulfill a dual function; they exclude external contaminants and prevent lubricant leakage from the bearing area. Trunnion seals for heavy duty universal joints can be divided in two distinct functional categories, purging and non-purging type seals, both of which utilize dual sealing lips. The outer lip on both type functions as a one-way valve to prevent contaminant flow into the bearing area. The inner sealing lip of a purging seal functions as a one-way valve to allow lubricating fluid to flow out of the bearing at a pressure exceeding the maximum operating pressure due to centrifugal head. Conversely the non-purging seal has a reversed inner lip which acts as a one-way valve to prevent lubrication fluid flow at any pressure, other than vacuum.

The purpose of a purging trunnion seal is to allow lubrication fluid flow through a central lubrication fitting to all four bearings and to provide a means for purging out old lubricant or external contamination which penetrated the outer lip.

A reverse lip non-purging seal tightens against the trunnion as internal pressure increases, thus it is incapable of lubrication through a central lubricating fitting unless a method for pressure relief is provided. If a relief system is not available, the assembly must be dismantled and hand-packed with lubricant. Crosses are drilled through the four trunnions to provide holes which intersect at the center of the cross body. These holes have a dual purpose; one is to provide passages for lubricating all four trunnions through a central lubrication fitting and the other is to provide a reservoir of lubricant to feed upward into the bearing area to replace lubricant lost through the sealing lip. The column of lubricant in the cross lubricant hole of an 8.50" swing diameter universal joint exerts a centrifugal head of approximately 25/30 psi for example, at the seal lip when the cross and bearing assembly is rotating at 3,000 RPM.

An 8.50" swing diameter joint purging seal has a design purge pressure of approximately 50 psi which exceeds the operating pressure due to centrifugal head, however, the inner seal lip must then operate at high contact pressures at lower speeds, causing inner lip wear. This wear will reduce the purge pressure below 25/30 psi after a period of operation and the seal lip will leak lubricant when the cross and bearing is operated at higher speeds.

A non-purging seal inner lip is subject to maximum lip contact pressure and wear when it is operated at high speed. Although this wear has little initial effect on its ability to seal at high speeds, the wear does impair its ability to seal at low speeds and under static conditions. Eventually, excessive wear causes the seal to leak at high speed. Both purging and non-purging seals are forced to operate at lip contact pressures which are considered to be excessive for elastomeric type seals and which causes them to wear and ultimately leak. Because of this wear, grease is used as a lubricant to minimize the leakage problem, although it is well known that a 90 or 120 weight oil is a superior lubricant for universal joint cross and bearings.

Cross and bearing operating pressure is also a function of operating temperature because the assembly is essentially completely filled with lubricant at ambient temperature and there is no provision for expansion.

Internal pressure in a cross and bearing with purging type seals will increase as the operating temperature rises until it reaches the purge pressure of the inner lip (50 psi, for example). At this point, lubricant will be expelled and the pressure will be relieved. Tests indicate that more lubricant fluid volume is expelled than is necessary to simply relieve pressure and air is ingressed through the temporarily open lip. This assumption is based on the fact that internal pressure does not go to vacuum when the cross trunnion and bearing is cooled to room temperature, which would be the case if only the precise amount of grease was expelled. Repeat heating of the cross and bearing may expel additional fluid, however, at some point in the heat/cool cycle the volume of internal air becomes large enough so that the pressure caused by expansion of the fluid/air mixture is less than the purge pressure of the inner lip and no further lubricant leakage occurs.

Since a reversed lip non-purging seal is not capable of pressure relief, it can be seen that the cross trunnion and bearing internal pressure is a function of lubricant temperature, coefficient of expansion, and bulk modulus. In a typical cross trunnion and bearing, this pressure has been measured at 150 psi at 200° F. This amount of internal pressure will result in heavy seal lip wear. When the cross and bearing is cooled to ambient, the internal pressure goes briefly to vacuum which suggests that a non-purging seal will have a tendency to ingress external contaminant. The addition of a low pressure venting system will prevent the seal from operating at high internal pressure due to changes in operating temperatures.

SUMMARY OF THE PRESENT INVENTION

The present invention provides a universal joint, cross trunnion seal and venting system which incorporates the desirable performance characteristics of both purging and non-purging type elastomeric seals and which also corrects deficiencies associated with those two types of prior art seals. More specifically, the present invention provides a mechanical seal of the metal face type which:

(1) has the ability to withstand the lubricant centrifugal head pressure without sustaining any appreciable wear;

(2) are designed so that internal fluid pressure creates face seal contact pressures which exceed the pressure of the lubricant fluid, thereby providing a seal which is self-sealing and requires no spring or other resilient force to effect sealing during operation;

(3) are essentially zero leakage devices which require minimum lubrication maintenance and are suitable for use with, for example, 90 or 120 weight oil;

(4) provides an elastomeric "O"-ring which functions as a static seal that is not subjected to motion and consequent wear;

(5) provides a cross and bearing assembly that has a venting system in association with the face seals to provide for purged lubrication of the bearing area and also central lubrication of all four bearing areas in the cross;

(6) provides a pressure relief device located on the center of rotation where it will not be subjected to lubricant centrifugal head effect, thereby relief pressure can be selected which is based on the desired pressure increase due to temperature. Consequently, the system relief pressure can be selected so that the internal pressure due to temperature remains low;

(7) provides fluid passages and relief holes which are so located that the lubricant must flow thru the bearing areas before it can escape through the relief passages to the center of the cross. Additional lubricant reserve capacity is also thus provided;

(8) provides relief holes through the trunnion body which are located on the approximate neutral axis for cross trunnion bending, the bending occurs whenever torque is being transmitted by the assembly.

These and other objects and advantages of the present invention will appear hereinafter as this disclosure progresses, reference being had to the accompanying drawings.

BRIED DESCRIPTION OF THE DRAWINGS

DESCRIPTION OF A PREFERRED EMBODIMENT

Figure 1:
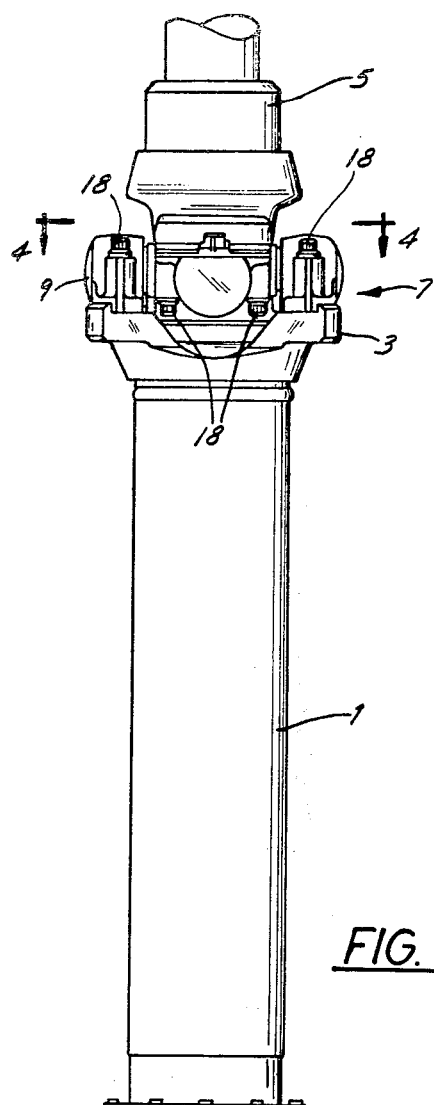
FIG. 1 is a view of a drive shaft assembly having a universal joint at either end thereof which is made in accordance with the present invention.
Figure 2:
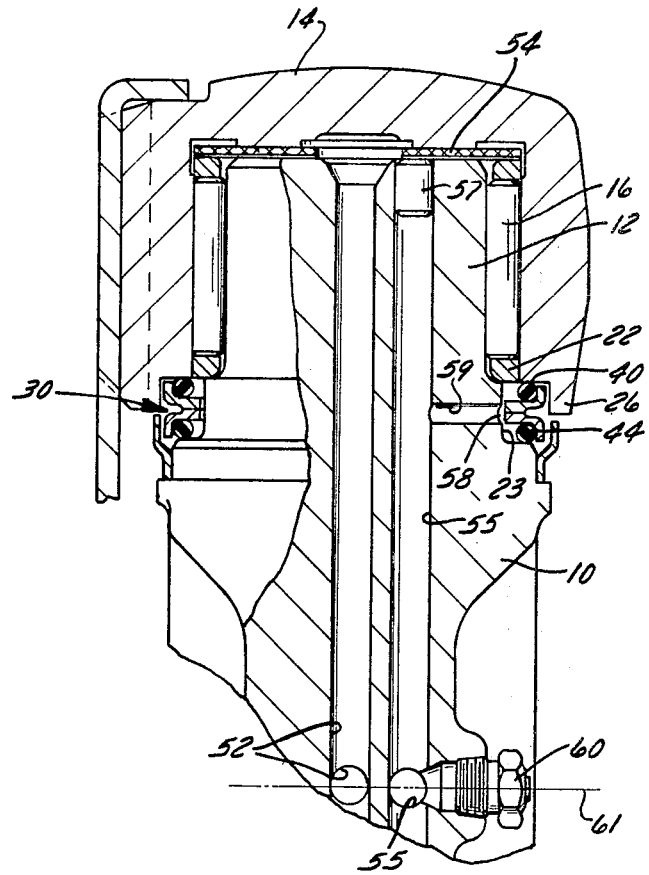
FIG. 2 is an enlarged fragmentary cross sectional view, with certain parts shown as broken away or removed, of one end of the cross-shaped body as shown in FIG. 4, the view being taken generally along the line 2—2 in FIG. 4.

The invention has been shown in connection with a shaft 1 which has a yoke 2 and 3 at each end thereof. The yokes 2 and 3 are connected, respectively, to fitting yokes and shafts 4 and 5 by means of a universal joint indicated generally at 6 or 7 and cross and bearing assemblies 8 and 9, respectively. The shaft 1 may be of the telescoping type and consists of two parts which are rotatably driven together by means of splines and telescope relative to one another. Such a construction is shown in my U.S. patent application Ser. No. 136,704, filed Apr. 2, 1980, issued on Jan. 5, 1982, as Pat. No. 4,308,729, and entitled "Universal Joint Slip Spline Connection". That application has also been assigned to an assignee common with the present application.

Each end of the shaft 1 is identical and a further detailed description of that construction will now be made.

The universal joints comprise a cross 10 having four trunnion pins 12 radiating therefrom and arranged at 90 degrees to one another. These cylindrical trunnion pins have a cylindrical bushing 14 rotatably mounted thereon by means of anti-friction bearing means in the form of conventional roller bearings 16. The cylindrical bushings are secured by bolt means 18 to their respective yokes in the known manner.

The trunnion pins 12 have an inner, annular shoulder 20 (FIG. 3) against which the inner ring 22 of the roller bearing assembly is firmly seated. The inner end of the cylindrical bushings 14 have an annular recess or groove 23 which forms a shoulder 24 and defines an axially extending annular flange 26 extending from the cylindrical bushing.

In accordance with the invention there has been provided a metal face-type seal indicated generally at 30. This trunnion seal includes a pair of identically shaped, ground and lapped rings 32 and 34 (see FIG. 3), which mate together to form a face seal. These rings may be fabricated of stamped steel, for example. Ring 32 has a flange 35 and a clearance is provided between it and flange 26 of cap or bushing 14. Ring 32 also includes a transversely extending flange 36 having a sealing surface 37 which is finished as by grinding and lapping and which rotationally bears against a similar surface 38 of ring 34, thereby forming a mechanical seal at the juncture.

Elastomeric "O" rings provide a static seal between the trunnions 10 and the bushings 14. More specifically, a rubber o-ring seal 40 is nested in the ring 32 and is in sealing engagement with the inner surface of flange 36 and the shoulder 24 of the cylindrical bushing 14. A similar o-ring seal 44 is nested in the ring 23 and bears against the shoulder 20 of the trunnion body. The o-rings also act as a resilient means which forces the lapped surfaces 37 and 38 of the steel rings together to prevent leakage at low internal pressure or in the event that internal pressure goes to vacuum.

Figure 3:
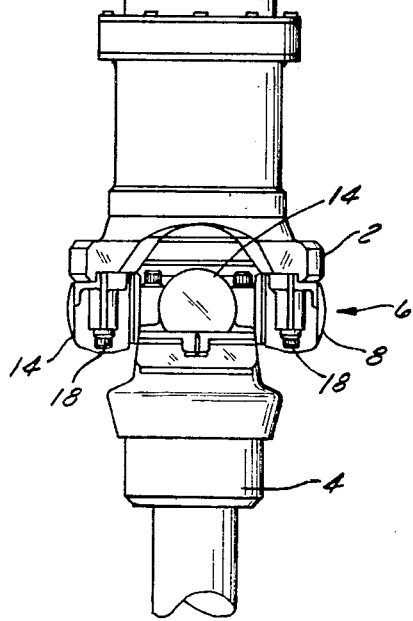
FIG. 3 is an enlarged, fragmentary, cross-sectional view of a portion of the metal face seal assembly shown in FIG. 2.
Figure 3:
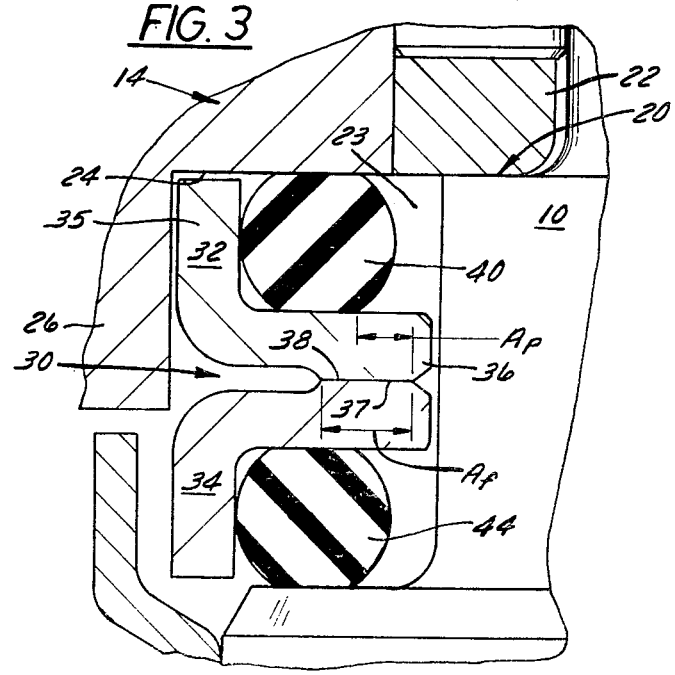

FIG. 3 is a view of the face seal stampings of rings 32 and 34 and shows relationship of net internal area ($A_p$) to face seal area ($A_f$). If the ratio of $A_p$ to $A_f$ is equal to or greater than 0.60, the face seal will be selfsealing and require no external spring force to seal internal pressure. Thus, in the present invention, the net internal area on which internal pressure acts on the rings in the bushing is at least 60 percent of the face sealing area between the rings, thereby providing mechanical face seals which are self-sealing.

Figure 4:
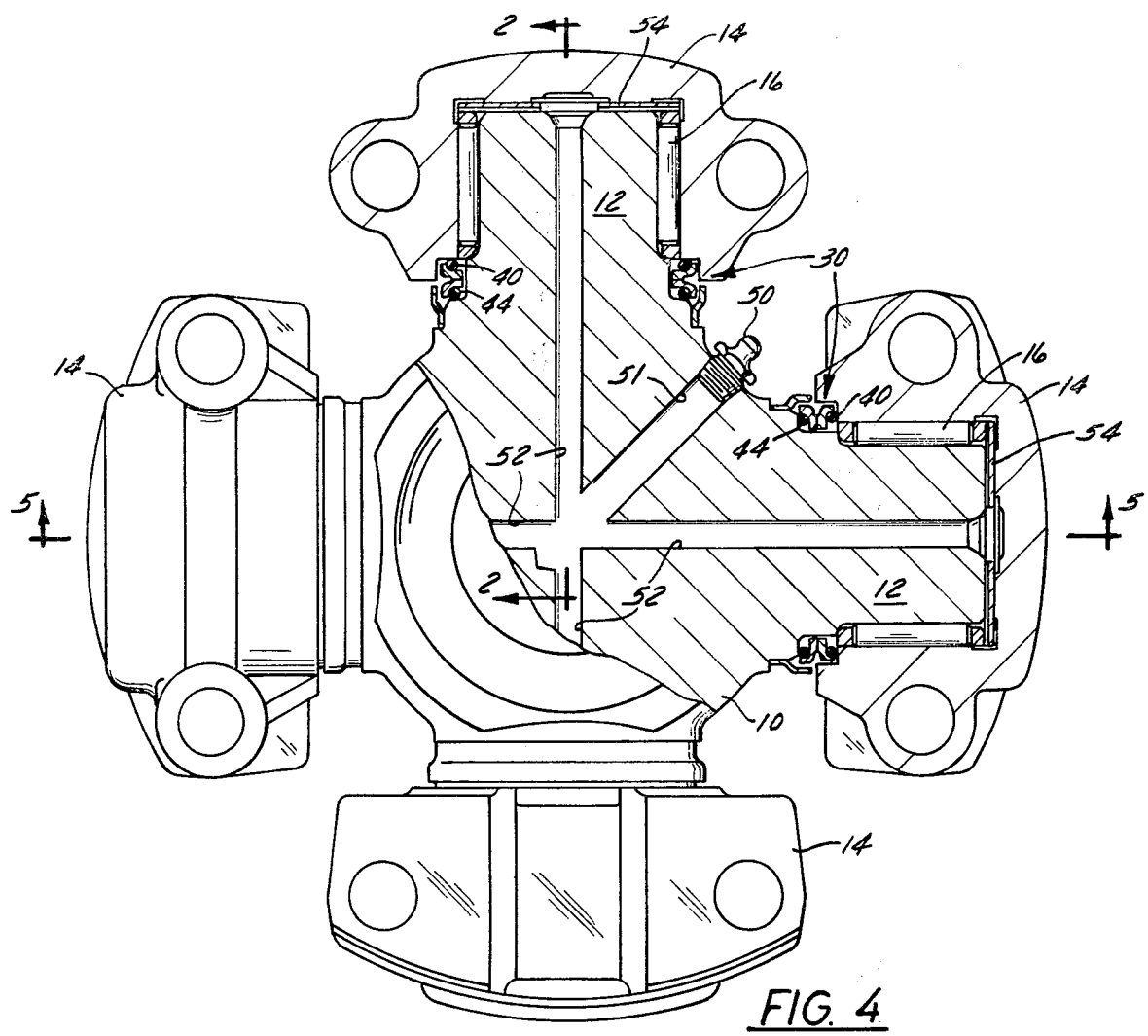
FIG. 4 is an enlarged view, partially in section of the cross-shaped trunnion and bearing assembly shown in FIG. 2, the view also being taken generally along the line 4—4 in FIG. 1.
Figure 5:
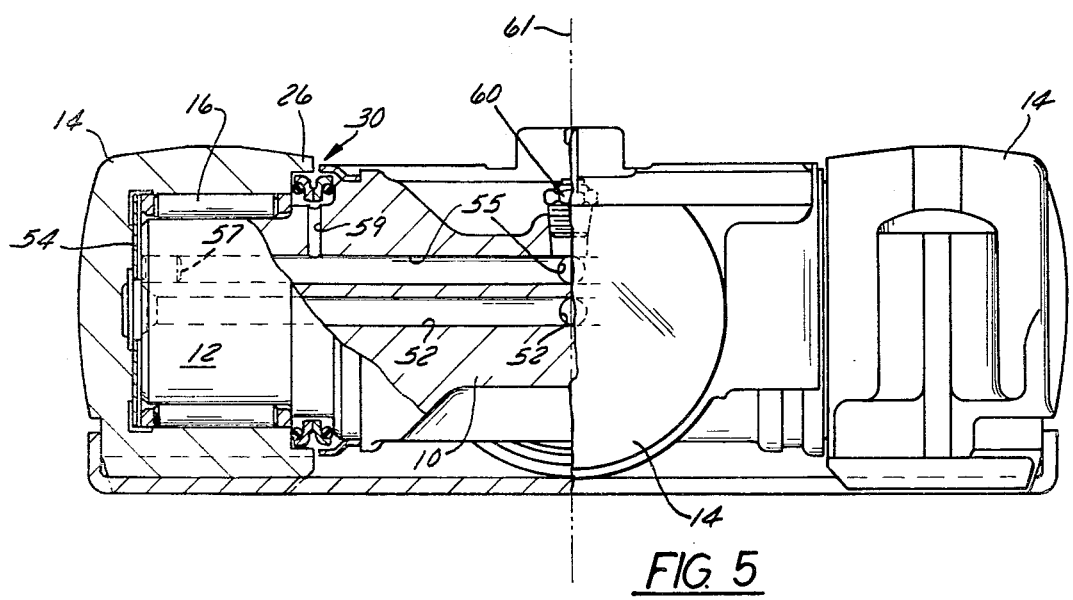
FIG. 5 is a view, partially in section taken along the line 5—5 in FIG. 4 and with certain parts being shown as broken away or removed for the sake of clarity.

Lubricating fluid is introduced (FIG. 4) via the fitting 50 through passage 51 and then through the four radially extending lubricating passages 52 that conduct the lubricating fluid to the outer end of the trunnion pins. The fluid then passes through the thrust washers grooves 54 and into the bearing area of the roller bearings. The fluid then passes into the area 58 of the mechanical face seal 30 from which it passes through a small relief passage 59 and into the relief passage 55. The outer end of relief passage 55 is closed by means of a fixed plug 57. Consequently, the excess pressure in the lubricating medium is released through a pressure relief fitting 60. It will be noted that the pressure relief fitting is located on the rotational axis of the cross trunnion and bearing assembly so that it is uneffected by centrifugal lubricant head.

Central lubrication is accomplished by inserting lubricant through a single lubrication passage 51 to the four lubrication passages 52 which then distribute lubricant to each of the four trunnions, flowing through the lubricant passage groove in the thrust washers into the anti-friction bearing area from where it then enters relief passage 59 into the long drilled relief passage hole 55. Because relief passage 55 is plugged at 57 at the outer end of the trunnion, the lubricant must break through the bearing area and exit through passage 59. The four relief passages 55 intersect at the center of the cross-shaped trunnion and are intersected by a single relief fitting 60. The relief fitting is on the rotational axis 60 of cross and bearing assembly so that it is unaffected by centrifugal lubricant head. The above lubrication system provides a means for venting internal pressure caused by changes in operating pressure. It also serves as a lubricant reservoir.

I claim:

1. A sealing and venting assembly for a trunnion and bearing for a universal joint, said assembly comprising a cross having a plurality of trunnion pins extending therefrom, a cylindrical bushing rotatably mounted on and over the outer end of each of said trunnion pins, an anti-friction roller bearing assembly located between each of said trunnion pins and its associated cylindrical bushing for rotatably journalling said bushing on its trunnion pin, a mechanical, face type trunnion seal located between said trunnion pin and said cylindrical bushing, said trunnion seal comprising a pair of stamped L-shaped steel rings having adjacent ground and lapped surfaces which abut together to form a mechanical face seal having a face sealing area therebetween; said rings having a net internal area on which internal pressure acts on said rings; the ratio of said net internal area to said face sealing area being at least 0.60 to render said face seal self-sealing; said face type trunnion seal also including a pair of elastomeric o-rings bearing against said cylindrical bushing, said rings and said trunnion pin.

2. The assembly set forth in claim 1 including lubrication passage means extending through said cross for delivering lubricating fluid to and through said bearing assemblies and into said mechanical face type trunnion seals for lubrication thereof, a pressure relief fitting in said cross and lubrication fluid relief passages in said cross and extending from said face type trunnion seals and to said pressure relief fitting.

3. The assembly set forth in claim 2 wherein said pressure relief fitting is located at the approximate rotational axis of said cross.

4. The assembly set forth in claim 1 further characterized in that said cylindrical bushings each have an annular groove formed in its inner end and one of said rings is located in said groove and further characterized in that said trunnion pin has an annular shoulder in which said other ring is located.

* * * * *